United States Patent
Kojima et al.

(10) Patent No.: US 12,132,318 B2
(45) Date of Patent: Oct. 29, 2024

(54) SOLAR POWER GENERATION NETWORK SHUT-OFF UNIT AND A SOLAR POWER GENERATION NETWORK SHUT-OFF SYSTEM PROVIDED WITH SAME

(71) Applicant: OMRON CORPORATION, Kyoto (JP)

(72) Inventors: Hideaki Kojima, Kyoto (JP); Ryo Ogura, Kyoto (JP); Mitsunori Sugiura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 349 days.

(21) Appl. No.: 17/629,037

(22) PCT Filed: Feb. 18, 2020

(86) PCT No.: PCT/JP2020/006253
§ 371 (c)(1),
(2) Date: Jan. 21, 2022

(87) PCT Pub. No.: WO2021/038916
PCT Pub. Date: Mar. 4, 2021

(65) Prior Publication Data
US 2022/0278530 A1    Sep. 1, 2022

(30) Foreign Application Priority Data
Aug. 27, 2019 (JP) .................................. 2019-154492

(51) Int. Cl.
*H02J 3/38* (2006.01)
*H02H 7/20* (2006.01)
*H02H 7/26* (2006.01)

(52) U.S. Cl.
CPC ............... *H02J 3/381* (2013.01); *H02H 7/20* (2013.01); *H02H 7/26* (2013.01); *H02J 2300/24* (2020.01)

(58) Field of Classification Search
CPC ........ H02J 3/381; H02J 2300/24; H02J 3/001; H02H 7/20; H02H 7/26
See application file for complete search history.

(56) References Cited

U.S. PATENT DOCUMENTS

| 2001/0023703 | A1  | 9/2001  | Kondo et al. |
| 2003/0236587 | A1* | 12/2003 | Ono ................. H01L 21/67775 700/112 |

(Continued)

FOREIGN PATENT DOCUMENTS

| JP | 2001-320827 A | 11/2001 |
| JP | 2006-216660 A | 8/2006 |

(Continued)

OTHER PUBLICATIONS

An English translation of the International Search Report of a related international application PCT/JP2020/006024 mailed on Mar. 31, 2020.

(Continued)

*Primary Examiner* — Christopher E. Everett
(74) *Attorney, Agent, or Firm* — METROLEX IP LAW GROUP, PLLC; Robert L. Scott, Esq.

(57) ABSTRACT

A solar power generation network shut-off unit is disposed between a plurality of solar power generation modules and a power conditioner, shuts off the supply of power the power generation modules to the power conditioner when an emergency shut-off button is pressed, and comprises a first circuit breaker, second circuit breakers, and a power supply line. When the first circuit breaker detects that the emergency shut-off button has been pressed, the supply of power from the first circuit breaker to the second circuit breakers is (Continued)

halted, and the supply of power from the solar power generation modules through the power line is shut off at the second circuit breakers.

6 Claims, 9 Drawing Sheets

(56) References Cited

U.S. PATENT DOCUMENTS

| | | | |
|---|---|---|---|
| 2009/0121549 A1 | 5/2009 | Leonard et al. | |
| 2010/0030345 A1* | 2/2010 | Cole | G05B 19/418 700/3 |
| 2011/0115301 A1 | 5/2011 | Bhavaraju et al. | |
| 2011/0172842 A1* | 7/2011 | Makhota | G05B 9/02 700/286 |
| 2012/0048326 A1* | 3/2012 | Matsuo | H02S 50/10 702/65 |
| 2012/0050924 A1 | 3/2012 | Matsuo et al. | |
| 2013/0320767 A1 | 12/2013 | Huang et al. | |
| 2016/0372929 A1 | 12/2016 | Ishikawa | |
| 2017/0207620 A1* | 7/2017 | Zhu | H01L 31/02021 |
| 2017/0288384 A1 | 10/2017 | Loewenstern et al. | |
| 2017/0373610 A1 | 12/2017 | White et al. | |
| 2018/0013292 A1* | 1/2018 | White | H04B 3/54 |
| 2018/0287484 A1 | 10/2018 | Braginsky et al. | |
| 2018/0351354 A1 | 12/2018 | Galin et al. | |
| 2019/0027617 A1 | 1/2019 | Varlan et al. | |

FOREIGN PATENT DOCUMENTS

| | | | |
|---|---|---|---|
| JP | 2013-247787 A | 12/2013 | |
| JP | 2013-252046 A | 12/2013 | |
| JP | 2014-33587 A | 2/2014 | |
| JP | 2016-135016 A | 7/2016 | |
| JP | 2016-208635 A | 12/2016 | |
| JP | 2017-184355 A | 10/2017 | |
| JP | 2018-509868 A | 4/2018 | |
| JP | 2019-103209 A | 6/2019 | |
| WO | 2015/087638 A1 | 6/2015 | |
| WO | WO-2020171229 A1 * | 8/2020 | ............ B64C 13/20 |
| WO | 2021/038914 A1 | 3/2021 | |
| WO | 2021/038915 A1 | 3/2021 | |

OTHER PUBLICATIONS

An English translation of the Written Opinion of a related international application PCT/JP2020/006024 mailed on Mar. 31, 2020.
An English translation of the International Search Report of a related international application PCT/JP2020/006025 mailed on Apr. 28, 2020.
An English translation of the Written Opinion of a related international application PCT/JP2020/006025 mailed on Apr. 28, 2020.
An English translation of the International Search Report of PCT/JP2020/006253 mailed on Mar. 31, 2020.
An English translation of the Written Opinion of PCT/JP2020/006253 mailed on Mar. 31, 2020.
Office Action issued on Sep. 26, 2023 in a related US patent application.

* cited by examiner

SOLAR POWER GENERATION NETWORK SHUT-OFF UNIT AND A SOLAR POWER GENERATION NETWORK SHUT-OFF SYSTEM PROVIDED WITH SAME

TECHNICAL FIELD

The present invention relates to a solar power generation network shut-off unit that shuts off the supply of power between solar power generation modules and a power conditioner, and to a solar power generation network shut-off system provided with the unit.

BACKGROUND ART

Recent years have seen the use of a solar power generation system in which DC voltage is generated by photoelectric conversion in a solar power generation module, and the DC voltage generated in the solar power generation modules is converted into AC voltage by an inverter of a power conditioner, and then outputted.

With a solar power generation system such as this, as shown in Patent Literature 1 and 2, for example, a circuit breaker is provided to shut-off the supply of power from the solar power generation modules during the installation, repair, or maintenance of the solar power generation modules, or in the event of an emergency such as a fire, in order to ensure the safety of workers, firefighters, etc.

CITATION LIST

Patent Literature

Patent Literature 1: JP-A 2019-103209
Patent Literature 2: JP-A 2013-252046

SUMMARY

However, the following problem was encountered with the above-mentioned conventional solar power generation network shut-off system.

With the solar power generation network shut-off systems disclosed in the above-mentioned publications, one circuit breaker (a relay, a control unit, etc.) is provided for each solar power generation module. Therefore, installing all these circuit breakers takes a long time, and the installation cost may increase.

It is an object of the present invention to provide a solar power generation network shut-off unit with which the construction cost can be kept low when installing circuit breakers that operate in an emergency or the like, as well as a solar power generation network shut-off system provided with the unit.

The solar power generation network shut-off unit according to the first invention is disposed between a plurality of solar power generation modules and a power conditioner, and shuts off the supply of power from the solar power generation modules to the power conditioner when an emergency shut-off button is pressed, the solar power generation network shut-off unit comprising a first circuit breaker, second circuit breakers, and a power supply line. The first circuit breaker is provided to a power line connecting the plurality of solar power generation modules and the power conditioner in series, and, when the emergency shut-off button is pressed, shuts off the supply of power through this power line from the solar power generation modules. One second circuit breaker is provided for a plurality of solar power generation modules, the second circuit breakers are supplied with power from the first circuit breaker, and when the supply of power is halted, the supply of power from the solar power generation modules through the power line is shut off. The power supply line connects the first circuit breaker and the second circuit breakers, and supplies power from the first circuit breaker to the second circuit breakers. When the first circuit breaker detects that the emergency shut-off button has been pressed, the supply of power from the first circuit breaker to the second circuit breakers is halted, and the supply of power from the solar power generation modules through the power line is shut off at the second circuit breakers.

Here, a solar power generation network shut-off unit that is disposed between a plurality of solar power generation modules and a power conditioner, and that shuts off the supply of power from the solar power generation modules to the power conditioner when an emergency shut-off button is pressed, comprises a first circuit breaker that shuts off the supply of power when the emergency shut-off button is pressed, and second circuit breakers that shut off the supply of power from the solar power generation modules when the supply of power from the first circuit breaker is halted after shut-off at the first circuit breaker.

Here, for example, one first circuit breaker is disposed in the vicinity of an inverter included in the power conditioner, and shuts off the supply of power from the solar power generation module to the power conditioner.

The second circuit breakers are disposed, for example, in the vicinity of the plurality of solar power generation modules and on the upstream side of the first circuit breaker along the power supply path from the solar power generation modules to the power conditioner. The he second circuit breakers are in their closed state while power is being supplied from the first circuit breaker, so that the power from the solar power generation modules is supplied to the downstream side, and when the supply of power from the first circuit breaker is interrupted, this shuts off the supply of power from the solar power generation modules.

The emergency shut-off button may be provided anywhere in the system in which the solar power generation network shut-off unit is installed and which includes a plurality of solar power generation modules and a power conditioner.

Consequently, when the emergency shut-off button is pressed in an emergency such as fire, or during repair or maintenance, for example, first, the first circuit breaker shuts off the supply of power from the solar power generation modules to the power conditioner, and the supply of power is also halted from the first circuit breaker to the second circuit breakers, which allows the supply of power from the solar power generation modules to the power conditioner to be shut off on the second circuit breaker side.

As a result, when the emergency shut-off button is pressed, it is possible to prevent the high-voltage power supplied from the solar power generation modules from being applied, which ensures the safety of workers or the like. Also, by using a combination of second circuit breakers that are provided to each of a plurality of solar power generation modules and a first circuit breaker that controls the shut-off of the second circuit breakers, installation costs can be kept lower than with a conventional configuration in which one circuit breaker was provided to each individual solar power generation module.

Furthermore, since the shut-off operation of the first circuit breaker and the second circuit breakers can be performed without any communication between the first circuit breaker and the second circuit breakers, a shut-off system can be configured that does not rely on the reliability of communication.

The solar power generation network shut-off unit according to the second invention is the solar power generation network shut-off unit according to the first invention, wherein he first circuit breaker has a first emergency shut-off determination unit that detects that the emergency shut-off button has been pressed; a first shut-off unit that shuts off the supply of power from the solar power generation modules through the power line; a first shut-off control unit that controls the first shut-off unit so as to shut off the supply of power when the first emergency shut-off determination unit determines that the emergency shut-off button has been pressed; a power output unit that supplies power to the second circuit breakers; and a supplied power control unit that controls the power output unit so as to halt the supply of power to the second circuit breakers when the first emergency shut-off determination unit determines that the emergency shut-off button has been pressed.

Here, the first emergency shut-off determination unit detects the pressing of the emergency shut-off button, and the first shut-off control unit controls the shut-off in the first shut-off unit according to whether or not the emergency shut-off button has been pressed. Then, when the first emergency shut-off determination unit determines that the emergency shut-off button has been pressed, the supplied power control unit controls the power output unit so as to halt the supply of power to the second circuit breakers.

Consequently, the shut-off of the supply of power at the first circuit breaker is performed and the supply of power to the second circuit breakers is halted according to the operation status of the emergency shut-off, which allows the supply of power from the solar power generation modules to be shut off on the second circuit breaker side as well.

The solar power generation network shut-off unit according to the third invention is the solar power generation network shut-off unit according to the second invention, wherein the first circuit breaker further has a holding unit that sets a hold period from when the first emergency shut-off determination unit determines that the emergency shut-off button has been pressed until the supplied power control unit halts the supply of power to the second circuit breakers.

Here, the holding unit provided to the first circuit breaker sets a hold period from when the first emergency shut-off determination unit determines that the emergency shut-off button has been pressed until the supplied power control unit halts the supply of power to the second circuit breakers.

Consequently, the shut-off operation on the second circuit breaker side can be performed after a specific hold period has elapsed since the completion of shut-off on the first circuit breaker side.

As a result, the voltage applied to the terminal portion when a plurality of second circuit breakers are put in an open state, for example, can be lowered, and the withstand voltage of the second circuit breakers provided to each of a plurality of solar power generation modules can be reduced. Therefore, the cost can be significantly reduced as compared to a configuration in which one circuit breaker with high withstand voltage is provided to each individual solar power generation module.

The solar power generation network shut-off unit according to the fourth invention is the solar power generation network shut-off unit according to the second or third invention, wherein the first circuit breaker further has a display signal output unit that transmits to the power conditioner a display signal for controlling a display unit provided to the power conditioner so as to display that emergency shut-off is in progress when the first emergency shut-off determination unit determines that the emergency shut-off button has been pressed.

Here, when it is determined that the emergency shut-off button has been pressed, a message indicating that emergency shut-off is in progress, etc., is displayed on the display unit of the power conditioner.

Consequently, during repair or maintenance, or in the event of an emergency such as a fire, for example, a worker, firefighter, etc., can perform the work, etc., after first checking the message displayed on the display unit of the power conditioner, and this prevents the application of the high-voltage power supplied from the solar power generation modules to the worker, etc., and therefore improves safety.

The solar power generation network shut-off unit according to the fifth invention is the solar power generation network shut-off unit according to any of the first to fourth inventions, wherein the second circuit breakers have a power input unit to which power is supplied from the first circuit breaker, and a second shut-off unit that shuts off the supply of power from the solar power generation modules through the power line when the supply of power to the power input unit is halted.

Here, when the supply of power to the power input unit is halted on the second circuit breaker side, the supply of power from the solar power generation module through the power line is shut off.

Consequently, when the supply of power from the first circuit breaker, which has shut off the supply of power from the solar power generation modules through the power line, to the second circuit breakers is halted, the supply of power from the solar power generation modules through the power line can also be shut off on the second circuit breaker side.

The solar power generation network shut-off system according to the sixth invention comprises the solar power generation network shut-off unit according to any of the first to fifth claims; a plurality of solar power generation modules; a power conditioner; a power line; and an emergency shut-off button.

The effect of using a system configuration comprising the above-mentioned solar power generation network shut-off unit is that the safety of workers and the like can be ensured, and the installation cost when installing circuit breakers that operate in an emergency, etc., can be reduced.

Effect

With the solar power generation network shut-off unit according to the present invention, the installation cost can be reduced when installing circuit breakers that operate in an emergency, etc.

DESCRIPTION OF EMBODIMENTS

Figure 1:
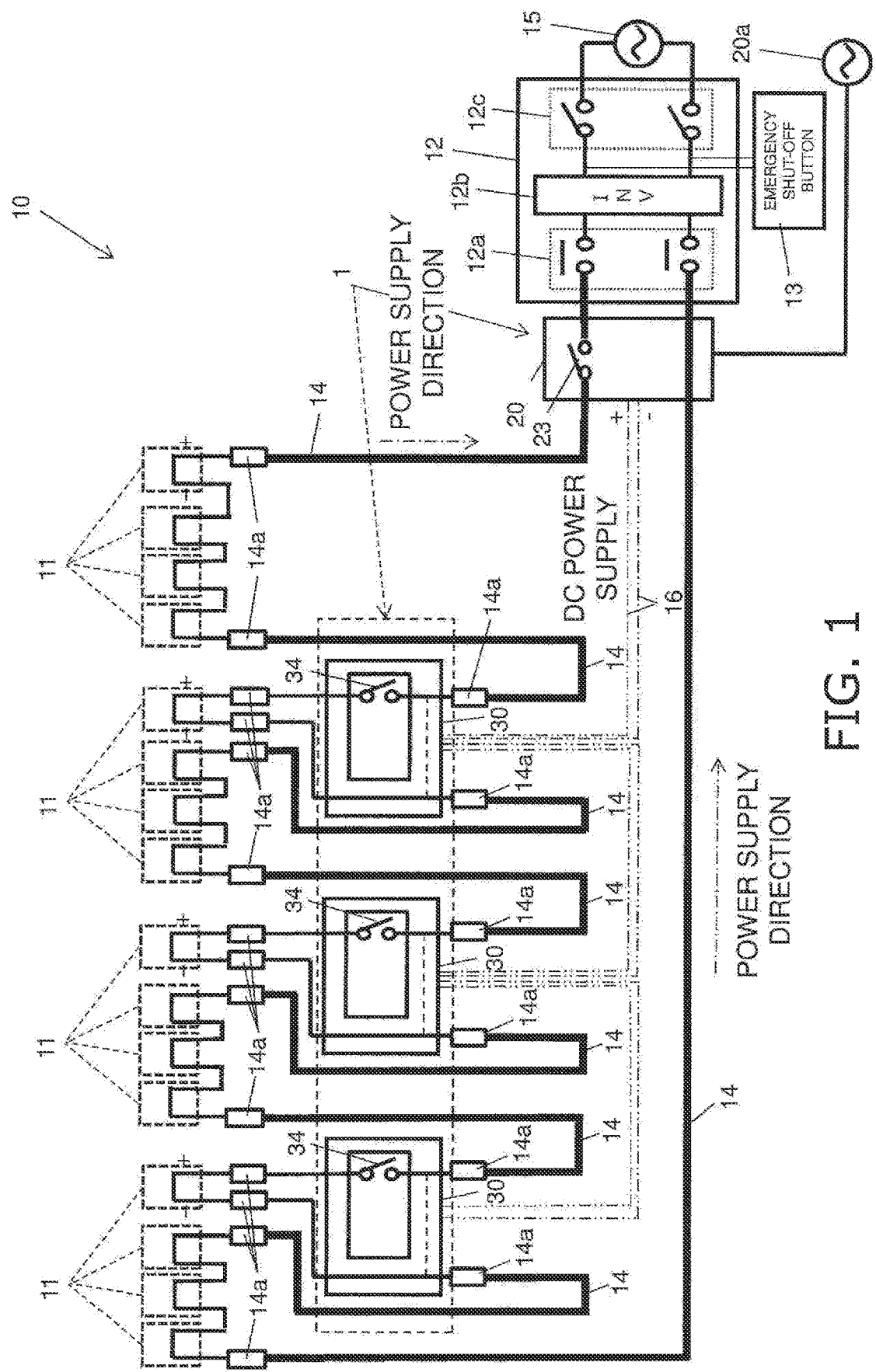
FIG. 1 is a system block diagram of the configuration of the solar power generation network shut-off system according to an embodiment of the present invention.

A solar power generation network shut-off system 10 including a solar power generation network shut-off unit 1 according to an embodiment of the present invention will now be described with reference to FIGS. 1 to 9.

In the following description, "upstream side" and "downstream side" refer to the upstream side and the downstream side in the power supply direction in which the power generated by photoelectric conversion in solar power generation modules 11 is supplied to a power conditioner 12.

(1) Configuration of Solar Power Generation Network Shut-Off System 10

The solar power generation network shut-off system 10 of this embodiment shuts off the supply of power from a plurality of the solar power generation modules 11 to the power conditioner 12 in an emergency, etc., for example, in a solar power generation network in which power generated by photoelectric conversion in the solar power generation modules 11 is supplied to a commercial power system 15 or a load device. More specifically, the solar power generation network shut-off system 10 is disposed between the solar power generation modules 11 and the power conditioner 12, and when the emergency shut-off button 13 is pressed, the supply of power from the solar power generation modules 11 to the power conditioner 12 is shut-off.

With a solar power generation network in which the solar power generation network shut-off system 10 is installed, the electric power generated by photoelectric conversion in the solar power generation modules 11 is supplied to the conditioner 12 through the power line 14, which is connected via a plurality of connectors 14a. Then, as shown in FIG. 1, the power conditioner 12 converts DC power into AC power via a relay 12a, an inverter 12b, and a relay 12c, and this power is supplied to the commercial power system 15 or a load device.

Here, possible scenarios in which the emergency shut-off button 13 would be pressed by a person are, for example, a case in which installation, replacement, maintenance, or other such work is performed on the solar power generation modules 11, or a case in which there is an emergency such as a fire.

When the emergency shut-off button 13 is pressed, the high-voltage power supplied to the downstream side from the solar power generation modules 11 must be shut off in order to ensure the safety of workers, firefighters, or the like.

Therefore, as shown in FIG. 1, the solar power generation network shut-off system 10 comprises the solar power generation network shut-off unit 1, the solar power generation modules 11, the power conditioner 12, the emergency shut-off button 13, and the power line 14.

The solar power generation network shut-off unit 1 comprises a single first circuit breaker 20 that functions as a master unit, and a plurality of second circuit breakers 30 that function as slave units.

As shown in FIG. 1, one first circuit breaker 20 is installed in the solar power generation network shut-off system 10, and is disposed on the power line 14, downstream from the plurality of solar power generation modules 11 and the plurality of second circuit breakers 30, and just upstream from the power conditioner 12.

Consequently, the first circuit breaker 20 can shut-off the supply of power before the power supplied from the solar power generation modules 11 is supplied to the power conditioner 12.

Also, as shown in FIG. 1, the first circuit breaker 20 is driven by power supplied from an AC power supply 20a. When the emergency shut-off button 13 is pressed, the first circuit breaker 20 shuts off the supply of power through the power line 14 by moving the shut-off unit 23 from its closed state to its open state.

The detailed configuration of the first circuit breaker 20 will be described in detail below.

As shown in FIG. 1, a plurality of second circuit breakers 30 are provided to each of a plurality of (four in this embodiment) solar power generation modules 11. The second circuit breakers 30 are disposed on the power line 14, just downstream from the solar power generation modules 11 and on the upstream side of the first circuit breaker 20.

Consequently, the second circuit breakers 30 can shut-off the power supplied from the solar power generation modules 11 on the upstream side of the first circuit breaker 20.

Also, as shown in FIG. 1, the second circuit breakers 30 are driven by the power supplied from the first circuit breaker 20 through the power supply line 16. More specifically, the second circuit breakers 30 are in a closed state while receiving power from the first circuit breaker 20, and when the supply of power from the first circuit breaker 20 is halted, the shut-off unit 32 changes from a closed state to an open state, and this shuts off the supply of power from the plurality of solar power generation modules 11 through the power line 14.

The detailed configuration of the second circuit breaker 30 will be described in detail below.

The solar power generation modules 11 include a typical solar power generation panel that generates DC power by photoelectric conversion from sunlight, and has a built-in bypass diode, for example.

The power conditioner 12 converts the DC power generated by the solar power generation modules 11 into AC power and outputs this DC power to the commercial power system 15, a load device, or the like. As shown in FIG. 1, the power conditioner 12 comprises a relay 12a, an inverter 12b, and a relay 12c. The DC power generated by the solar power generation modules 11 into AC power by the inverter 12b, and this AC power is outputted to the commercial power system 15 or the like.

Figure 2:
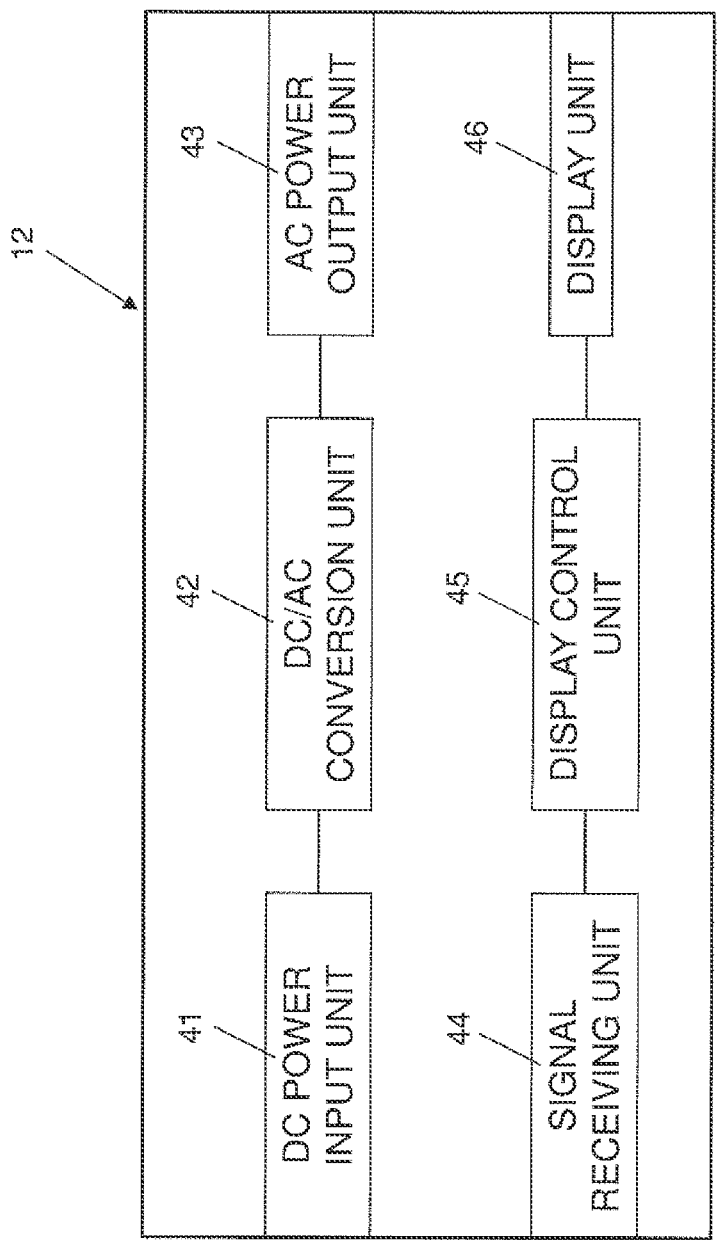
FIG. 2 is a block diagram of the configuration of the power conditioner included in the solar power generation network shut-off system in FIG. 1.

More specifically, as shown in FIG. 2, the power conditioner 12 comprises a DC power input unit 41, a DC/AC conversion unit 42, and an AC power output unit 43.

Consequently, the DC power supplied from the solar power generation modules 11 is inputted to the DC power input unit 41 and converted into AC power by the DC/AC conversion unit 42, and can then be outputted from the AC power output unit 43.

The power conditioner 12 further comprises a signal receiving unit 44 that receives a display control signal from the first circuit breaker 20 when emergency shut-off processing is executed by the first circuit breaker 20 (discussed below), a display control unit 45 that performs control so as to display a message indicating that emergency shut-off is in progress, etc., and a display unit 46 whose display is controlled by the display control unit 45.

The configuration of the power conditioner 12 is a typical configuration, and will therefore not be described in detail herein.

The emergency shut-off button 13 is disposed near the power conditioner 12, and is pressed by a worker performing repair or the like, a firefighter in the event of a fire, etc., to transmit an emergency shut-off button pressing signal to the first circuit breaker 20.

Consequently, the first circuit breaker 20 can execute emergency shut-off processing (discussed below) by receiving the emergency shut-off button pressing signal indicating that the emergency shut-off button 13 has been pressed.

The power line 14 serially connects the solar power generation modules 11 to each other, and also serially connects the solar power generation modules 11 and the power conditioner 12, and transmits the power supplied from the solar power generation modules 11 to the power conditioner 12.

(2) Solar Power Generation Network Shut-Off Unit 1

The solar power generation network shut-off unit 1 of this embodiment is disposed between the plurality of solar power generation modules 11 and the power conditioner 12, and is installed in order to shut off the supply of power from the solar power generation modules 11 to the power conditioner 12 when the emergency shut-off button 13 is pressed.

More specifically, in the solar power generation network shut-off unit 1 of this embodiment, when the emergency shut-off button 13 is pressed, the shut-off unit 23 in the first circuit breaker 20 is put into a shut-off state, and the supply of power from the first circuit breaker 20 to the second circuit breakers 30 is halted, which puts the shut-off units 32 in the second circuit breakers 30 in the shut-off state.

As shown in FIG. 1, the solar power generation network shut-off unit 1 comprises the first circuit breaker 20, the second circuit breakers 30, and the power supply line 16.

(2-1) First Circuit Breaker 20

Figure 3:
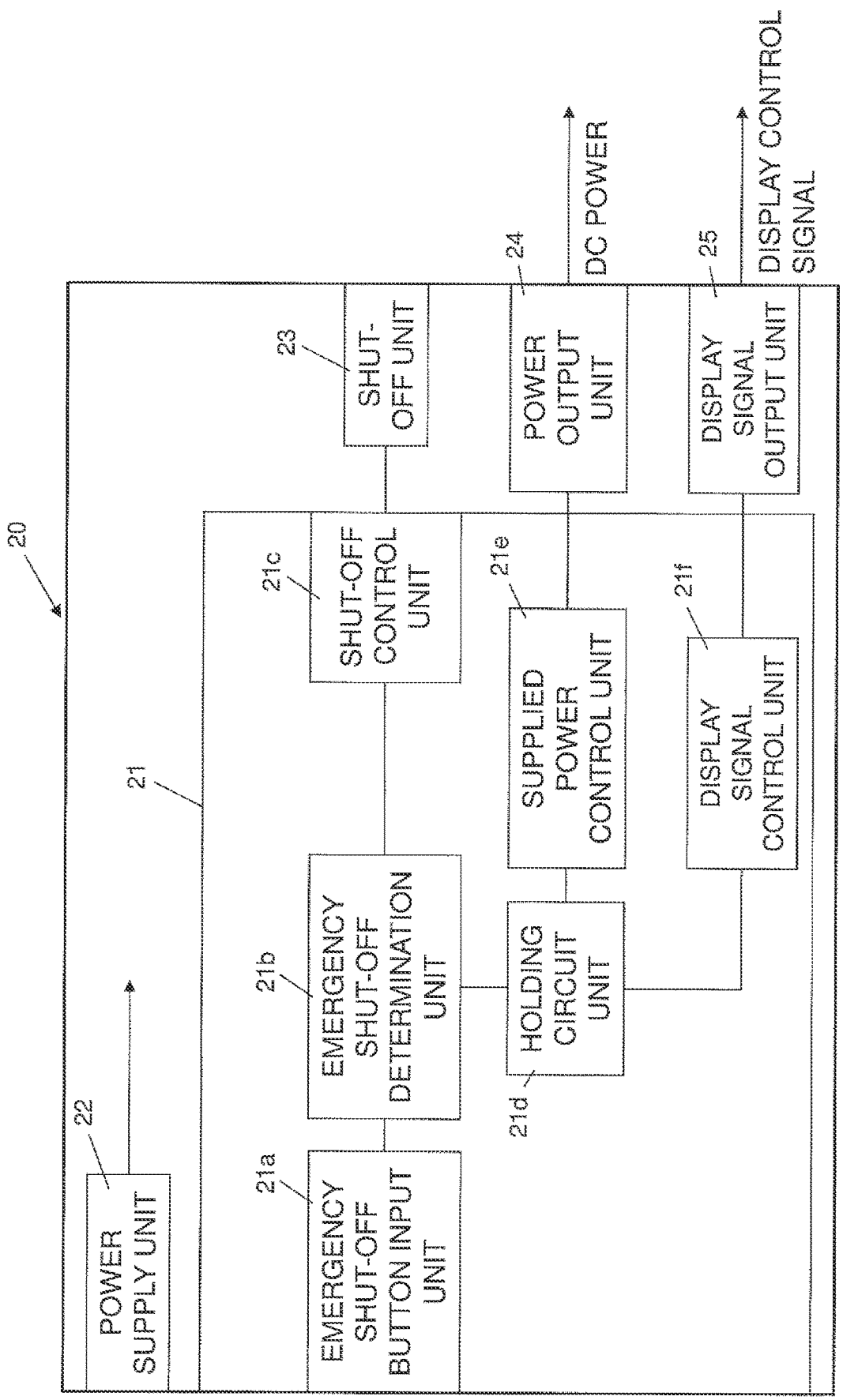
FIG. 3 is a block diagram of the configuration of a first circuit breaker constituting the solar power generation network shut-off unit included in the solar power generation network shut-off system in FIG. 1.

As shown in FIG. 1, the first circuit breaker 20 is disposed on the power line 14, just upstream from the power conditioner 12, and as shown in FIG. 3, has a control unit 21, a power supply unit 22, a shut-off unit (first shut-off unit) 23, a power output unit 24, and a display signal output unit 25.

The control unit 21 controls the components inside the first circuit breaker 20, and as shown in FIG. 3, has an emergency shut-off button input unit 21a, an emergency shut-off determination unit (first emergency shut-off determination unit) 21b, a shut-off control unit (first shut-off control unit) 21c, a holding circuit unit 21d, a supplied power control unit 21e, and a display signal control unit 21f.

The emergency shut-off button input unit 21a receives the emergency shut-off button pressing signal that is transmitted when the emergency shut-off button 13 is pressed, and transfers the received information to the downstream side.

The emergency shut-off determination unit (first emergency shut-off determination unit) 21b is connected to the emergency shut-off button input unit 21a, and determines whether or not an emergency shut-off button pressing signal has been inputted to the emergency shut-off button input unit 21a.

The shut-off control unit (first shut-off control unit) 21c is connected to the emergency shut-off determination unit 21b, and when the emergency shut-off determination unit 21b receives an emergency shut-off button pressing signal, moves the shut-off unit 23 from its closed state to its open state. This allows the shut-off control unit 21c to control the shut-off unit 23 so as to shut-off the supply of power through the power line 14.

The holding circuit unit 21d is connected to the emergency shut-off determination unit 21b, and performs timer control of the halting of the supply of power from the first circuit breaker 20 to the second circuit breakers 30. That is, upon receipt of an emergency shut-off button pressing signal, the holding circuit unit 21d sets a delay time for the second circuit breakers 30 for halting the supply of power to the second circuit breakers 30 after a specific hold period has elapsed since the receipt of the signal, and transmits this delay time to the power output unit 24.

The supplied power control unit 21e is connected to the holding circuit unit 21d, and when the emergency shut-off determination unit 21b determines that the emergency shut-off button 13 has been pressed, the power output unit 24 is controlled so as to halt the supply of power to the second circuit breakers 30 at the point when the hold period set in the holding circuit unit 21d has elapsed.

The display signal control unit 21f is connected to the holding circuit unit 21d, and when the emergency shut-off determination unit 21b determines that the emergency shut-off button 13 has been pressed, the display signal output unit 25 is controlled so as to output a display control signal to the signal receiving unit 44 of the power conditioner 12 at the point when the hold period set in the holding circuit unit 21d has elapsed.

As shown in FIG. 1, the power supply unit 22 is connected to an AC power supply 20a, performs AC/DC conversion or DC/DC conversion, and supplies power to the components constituting the first circuit breaker 20.

The shut-off unit (first shut-off unit) 23 is provided to the first circuit breaker 20 as a circuit breaker capable of shutting off the entire system voltage of the solar power generation network shut-off system 10. The shut-off unit 23 switches the shut-off state in the first circuit breaker 20 by controlling the opening and closing by means of the signal transmitted from the shut-off control unit 21c.

The power output unit 24 is connected to the supplied power control unit 21e, and halts the supply of power to the second circuit breakers 30 at the point when the hold period set in the holding circuit unit 21d has elapsed, on the basis of a command from the supplied power control unit 21e.

The display signal output unit 25 is connected to the display signal control unit 21f, and outputs a display control signal to the power conditioner 12 in response to a command from the display signal control unit 21f.

Consequently, the display unit 46 of the power conditioner 12 can display a message of "emergency shut-off in progress" or the like (see FIG. 7) after a specific hold period has elapsed since the first circuit breaker 20 went into the shut-off state, and the second circuit breakers 30 whose supply of power from the first circuit breaker 20 has been halted go into the shut-off state.

As a result, the second circuit breakers 30 can change to the shut-off state after a specific hold period has elapsed since when the first circuit breaker 20 went into the shut-off state, so the voltage applied to the contact portion when the second circuit breakers 30 are changed to the shut-off state can be reduced as compared with the first circuit breaker 20. Consequently, the second circuit breakers 30 can have a withstand voltage that is lower than that of the first circuit breaker 20, which significantly reduces the cost of the solar power generation network shut-off unit 1.

Also, with a configuration in which one second circuit breaker 30 is provided for four solar power generation modules 11 allows the installation cost to be reduced as compared with a configuration in which one circuit breaker is provided for each individual solar power generation module 11.

Furthermore, a message is displayed on the display unit 46 of the power conditioner 12 after the second circuit breakers 30 change to the shut-off state. Therefore, it is possible to prevent a message such as "emergency shut-off in progress" from being displayed in a state in which the second circuit breakers 30 have not yet changed to the shut-off state, which ensures the safety of workers, firefighters, and the like.

(2-2) Second Circuit Breakers 30

Figure 4:
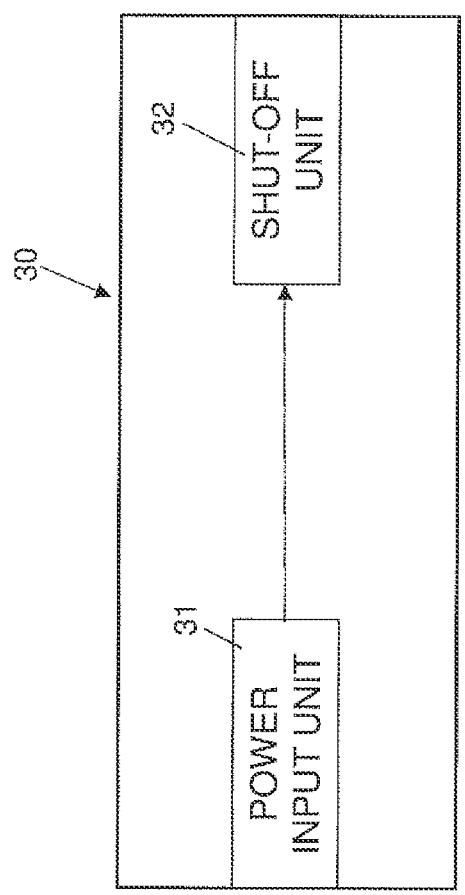
FIG. 4 is a block diagram showing the configuration of a second circuit breaker constituting the solar power generation network shut-off unit included in the solar power generation network shut-off system in FIG. 1.

As shown in FIG. 1, the second circuit breakers 30 are disposed on the power line 14, just downstream from the solar power generation modules 11, one for four solar power generation modules 11. As shown in FIG. 4, the second circuit breakers 30 have a power input unit 31 and a shut-off unit (second shut-off unit) 32.

The power input unit 31 is connected to the power supply line 16, and power supply from the first circuit breaker 20 to the second circuit breakers 30 is inputted through the power supply line 16.

The shut-off units (second shut-off units) 32 are provided to the second circuit breakers 30 as a circuit breaker capable of shutting off the supply of power from the solar power generation modules 11 included in the solar power generation network shut-off system 10 to the downstream side. The shut-off units 32 are configured to be in a closed state while power is being supplied from the first circuit breaker 20, and to be in an open state when the supply of power is halted, and thereby perform switching of the shut-off state in the second circuit breakers 30.

The shut-off control in the second circuit breakers 30 will now be described with reference to FIG. 5.

Figure 5:
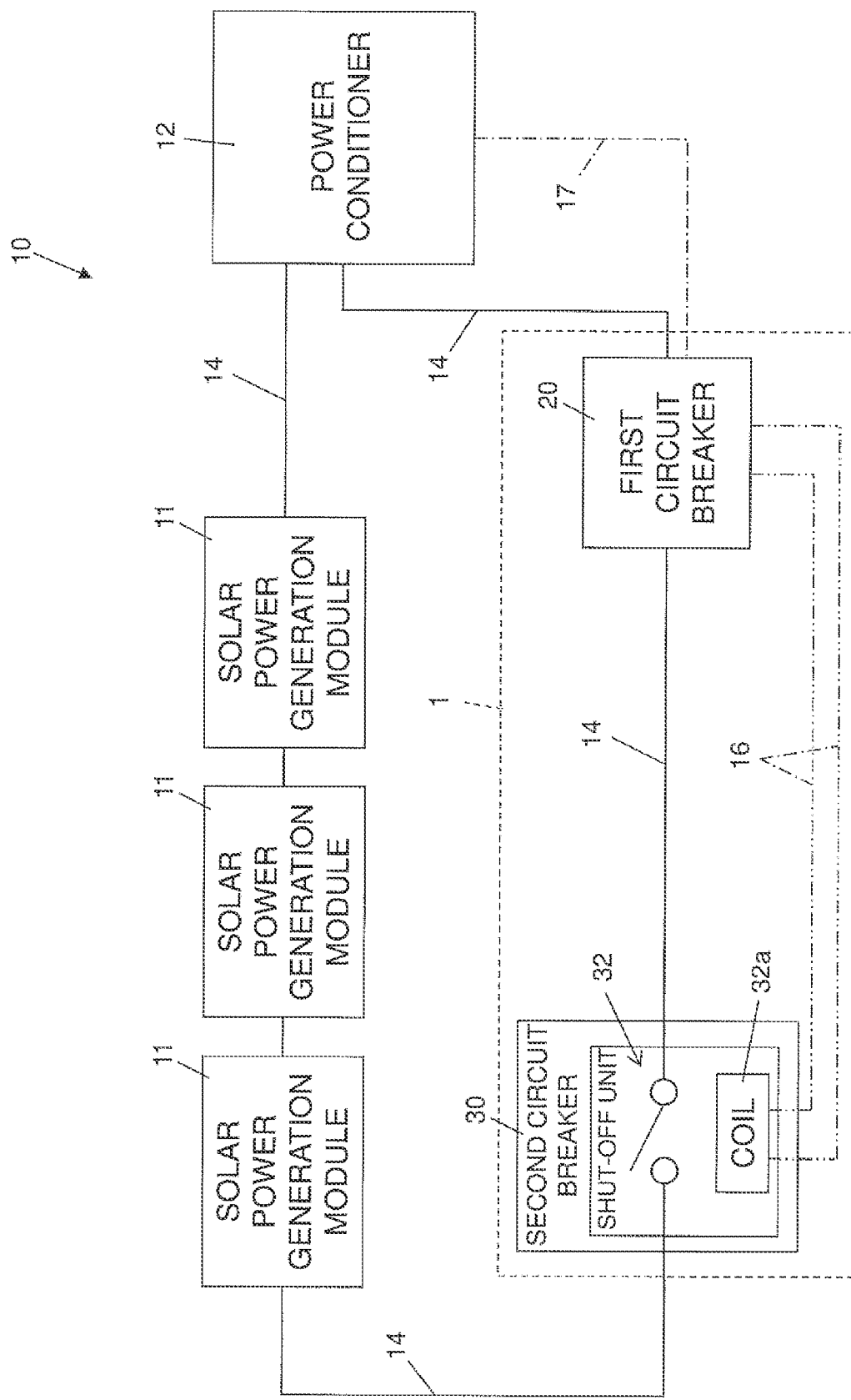
FIG. 5 is a diagram of the method for controlling shut-off on the second circuit breaker side by power control in the solar power generation network shut-off system of FIG. 1.

For the sake of convenience, FIG. 5 shows a configuration in which only one second circuit breaker 30 is provided, but actually, as shown in FIG. 1, let us assume that one is provided for every four solar power generation modules 11.

In the second circuit breaker 30, as shown in FIG. 5, a coil 32a is provided to the shut-off unit 32 that shuts off the supply of power from the solar power generation modules 11 to the power conditioner 12 through the power line 14.

When the coil 32a is supplied with power from the first circuit breaker 20, which is controlled by the power conditioner 12 through the signal line 17, through the power supply line 16, the shut-off unit 32 is changed to its closed state. On the other hand, when the supply of power to the coil 32a is halted, the shut-off unit 32 goes into its open state.

Consequently, the shut-off unit 32 of the second circuit breaker 30 can be switched between open and closed states by switching between supplying and halting power from the first circuit breaker 20.

Emergency Shut-Off Control by Solar Power Generation Network Shut-Off Unit 1

With the solar power generation network shut-off unit 1 of this embodiment, because of the above configuration, when the emergency shut-off button 13 is pressed, the first circuit breaker 20 puts the shut-off unit 23 in an open state and shuts off the supply of power to the shut-off unit 23, and halts the supply of power to the second circuit breakers 30 so as to put the shut-off units 32 of the second circuit breakers 30 in their open state and shut off the supply of power.

The emergency shut-off control performed by the solar power generation network shut-off unit 1 of this embodiment will now be described using the timing chart shown in FIG. 6.

Figure 6:
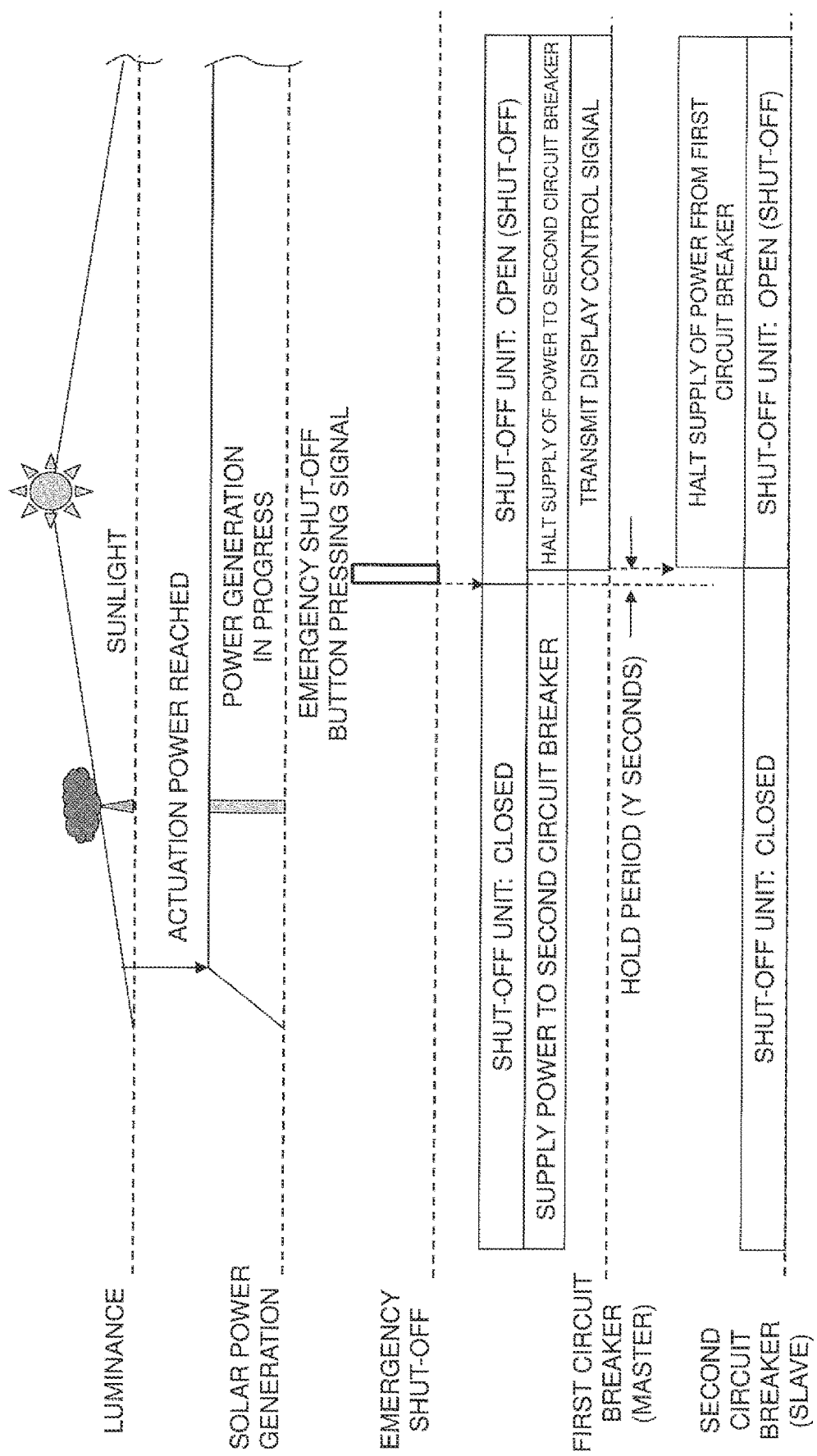
FIG. 6 is a timing chart showing the operation of the components constituting the solar power generation network shut-off system of FIG. 1 when the emergency shut-off button has been pressed.

That is, FIG. 6 shows the power generation status in the solar power generation module 11 according to the intensity (luminance) of sunlight, the pressing of the emergency shut-off button 13, the supply of power at the first circuit breaker 20 and the second circuit breakers 30, and the states of the shut-off units 23 and 34 along with the elapsed time.

As shown in FIG. 6, in the plurality of solar power generation modules 11, once the amount of power generation reaches a specific actuation power due to increased luminance as the sun rises after sunrise, power is supplied from the solar power generation modules 11 to the power conditioner 12.

At this point, since the first circuit breaker 20 receives power from the power supply unit 22 regardless of whether or not any solar power is being generated, the shut-off unit 23 is in its closed state.

Also, the second circuit breakers 30 receive a supply of power from the first circuit breaker 20, putting the shut-off units 32 in their closed state.

With the solar power generation modules 11, the power required to drive the second circuit breakers 30 can be supplied during the hours when the sunlight is strong and the luminance is high, but when the weather becomes cloudy or rainy, for example, there is a risk that supply of the required power will be temporarily impossible, as shown in FIG. 6.

However, with the solar power generation network shut-off unit 1 of this embodiment, since the second circuit breakers 30 are supplied with power from the first circuit breaker 20, the second circuit breakers 30 can be operated even if the sky temporarily clouds over and the amount of power supplied from the solar power generation modules 11 decreases.

Next, when the emergency shut-off button 13 is pressed during repair or maintenance work, in an emergency, etc., as shown in FIG. 6, at the first circuit breaker 20, the emergency shut-off determination unit 21b determines whether or not an emergency shut-off button pressing signal has been received by the emergency shut-off button input unit 21a, indicating that the emergency shut-off button 13 has been pressed.

At this point, since the emergency shut-off button input unit 21a is receiving the emergency shut-off button pressing signal, the shut-off control unit 21c switches the shut-off unit 23 from its closed state to its open state, and puts the first circuit breaker 20 in a shut-off state.

After this, at the first circuit breaker 20, when the shut-off unit 23 changes to the shut-off state and a specific hold period (Y seconds) elapses, the supply of power to the second circuit breakers 30 is halted and a display control signal is transmitted to the power conditioner 12.

At the second circuit breakers 30, when the supply of power from the first circuit breaker 20 to the power input unit 31 is halted, the shut-off units 32 change from their closed state to their open state.

Consequently, following the transition of the shut-off unit 23 of the first circuit breaker 20 to the shut-off state, the shut-off units 32 of the second circuit breakers 30 can also be changed to the shut-off state.

As a result, the withstand voltage of the second circuit breakers 30 provided to each of a plurality of solar power generation modules 11 can lower than that of the first circuit breaker 20, so the cost can be significantly reduced as compared with a configuration in which one circuit breaker with a high withstand voltage is provided for each individual solar power generation module 11.

Also, compared to a configuration in which one circuit breaker is provided for each individual solar power generation module 11, in this configuration one second circuit breaker 30 is provided for four solar power generation modules 11, so the installation cost can be reduced.

Figure 7:
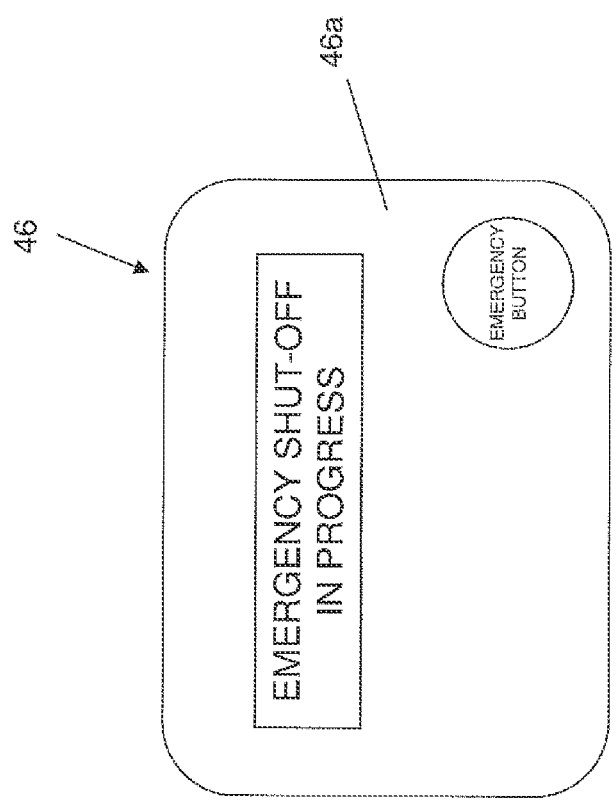
FIG. 7 is a diagram of the display screen of the display unit of the power conditioner when the emergency shut-off button is pressed and the first circuit breaker changes to a shut-off state.

Furthermore, with the power conditioner 12, when the signal receiving unit 44 receives the display control signal transmitted from the first circuit breaker 20, the display control unit 45 controls the display unit 46 so as to display the message "emergency shut-off in progress" on the display screen 46a shown in FIG. 7.

Consequently, in both the first circuit breaker 20 and the second circuit breakers 30, in a state where the shut-off units 23 and 32 have been changed to the shut-off state, a message indicating that emergency shut-off in progress can be displayed on the display screen 46a of the display unit 46 of the power conditioner 12.

As a result, the user can look at the display screen 46a of the display unit 46 of the power conditioner 12 to confirm that emergency shut-off processing is completed in the first circuit breaker 20 and the second circuit breakers 30, and this ensures the safety of workers in the event of repairs, etc., and firefighters in the event of a fire, etc.

Shut-Off Flow by Solar Power Generation Network Shut-Off Unit 1

The flow of shut-off carried out in the solar power generation network shut-off unit 1 of this embodiment will now be described using the flowcharts shown in FIGS. 8 and 9.

Figure 8:
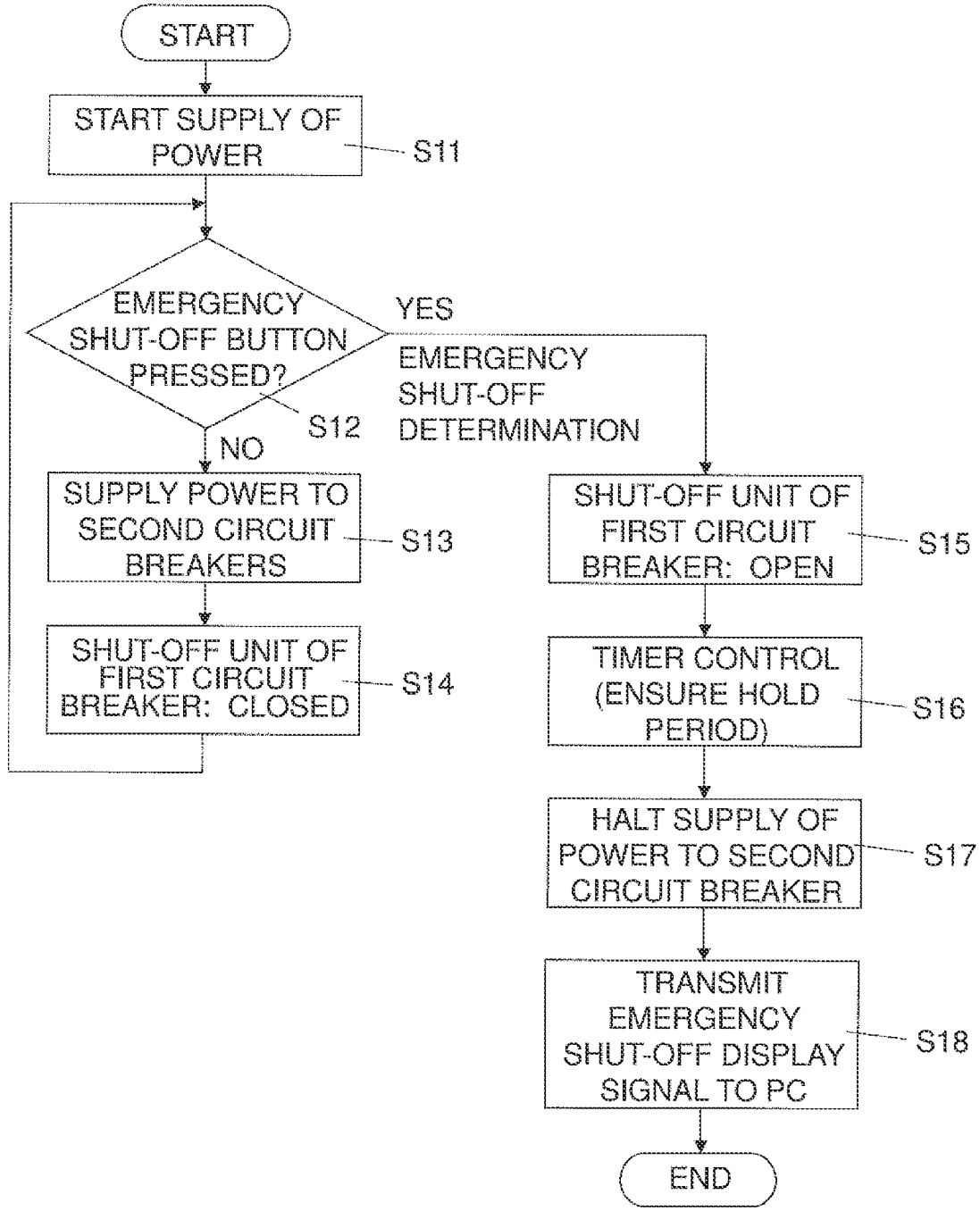
FIG. 8 is a flowchart showing the control flow in the first circuit breaker constituting the solar power generation network shut-off unit included in the solar power generation network shut-off system of FIG. 1.
Figure 9:
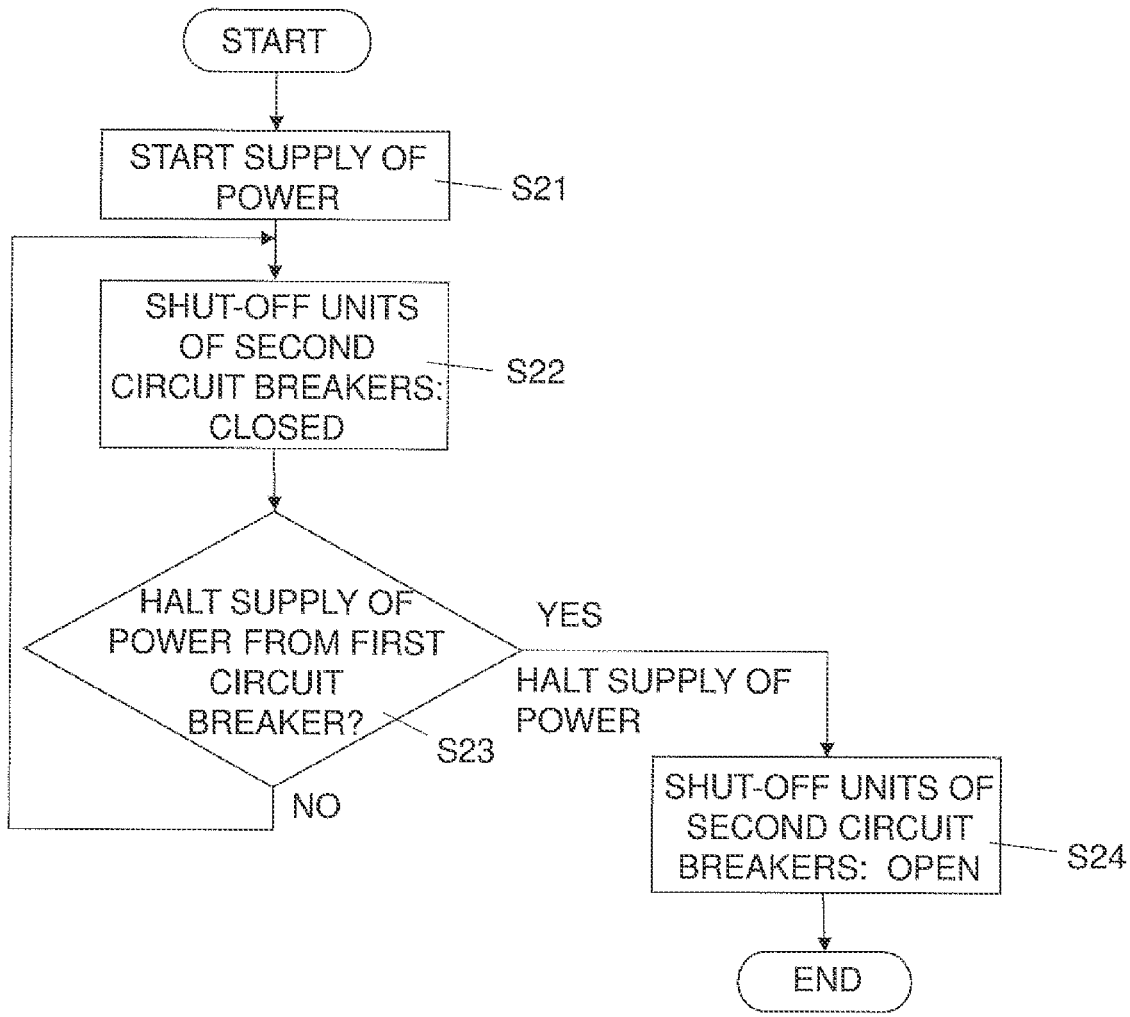
FIG. 9 is a flowchart showing the control flow in the second circuit breaker constituting the solar power generation network shut-off unit included in the solar power generation network shut-off system of FIG. 1.

FIG. 8 shows the processing in the first circuit breaker 20, and FIG. 9 shows the processing in the second circuit breakers 30.

Processing in First Circuit Breaker 20

As shown in FIG. 8, in the process on the first circuit breaker 20 side, first, when the supply of power to the first circuit breaker 20 is started in step S11, whether or not the emergency shut-off button 13 has been pressed is monitored in step S12.

If the button has not been pressed, the processing proceeds to step S13, and if it has been pressed, the processing proceeds to step S15.

Next, in step S13, since it was determined in step S12 that the emergency shut-off button 13 had not been pressed, in the first circuit breaker 20, the supplied power control unit 21e controls the power output unit 24 so as to supply power to the second circuit breakers 30.

Next, in step S14, the shut-off control unit 21c controls the shut-off unit 23 so as to maintain the shut-off unit 23 in its closed state. Consequently, power is supplied to the power conditioner 12 side through the power line 14 on the first circuit breaker 20 side.

After this, at the first circuit breaker 20, step S12 for determining whether or not the emergency shut-off button 13 has been pressed again, step S13 for starting the supply of power to the second circuit breakers 30, and processing for putting the shut-off unit 23 of the first circuit breaker 20 in its closed state are repeated.

Meanwhile, in step S15, since it was determined in step S12 that the emergency shut-off button 13 had been pressed, the shut-off unit 23 is immediately switched from its closed state to its open state, and the first circuit breaker 20 is put in a shut-off state.

More precisely, when the emergency shut-off determination unit 21b determines that the emergency shut-off button operation signal has been inputted to the emergency shut-off button input unit 21a, the shut-off control unit 21c immediately puts the shut-off unit 23 in its open state, and changes to the shut-off state.

Next, in step S16, if the specific hold period (Y seconds) set in the holding circuit unit 21d has elapsed since the shut-off unit 23 of the first circuit breaker 20 was put in its open (shut-off) state, in step S17 the supplied power control unit 21e controls the power output unit 24 so as to halt the supply of power to the second circuit breakers 30.

Next, in step S18, the display signal control unit 21f controls the display signal output unit 25 so as to transmit to the power conditioner (PC) 12 a display control signal for displaying on the display unit 46 of the power conditioner 12 the message "emergency shut-off in progress."

Consequently, at the power conditioner 12, the message "emergency shut-off in progress" (see FIG. 7) can be displayed on the display screen 46a of the display unit 46.

The above steps S11 to S18 conclude the processing in the first circuit breaker 20.

Processing in Second Circuit Breakers 30

As shown in FIG. 9, in the processing on the second circuit breakers 30 side, first, when the supply of power from the first circuit breaker 20 is begun in step S11, the shut-off units 32 of the second circuit breakers 30 are put in a closed state in step S12.

Next, in step S23, it is determined whether or not the supply of power from the first circuit breaker 20 has been halted, and if the supply of power has been halted, the processing proceeds to step S24, but if the supply of power has not been halted, the processing returns to step S22.

Next, in step S24, since the supply of power from the first circuit breaker 20 to the second circuit breakers 30 was halted in step S23, the shut-off units 32 of the second circuit breakers 30 are put in an open state to change to the shut-off state.

Consequently, when the supply of power from the first circuit breaker 20 is halted, the second circuit breakers 30 can also change to the shut-off state by putting the shut-off units 32 in their open state.

Main Features

As described above, the solar power generation network shut-off unit 1 of this embodiment is disposed between the solar power generation modules 11 and the power conditioner 12, and is a device for shutting off the supply of power from the solar power generation modules 11 to the power conditioner 12 when the emergency shut-off button 13 is pressed, the device comprising the first circuit breaker 20, the second circuit breakers 30, and the power supply line 16. The first circuit breaker 20 is provided on the power line 14 connecting the solar power generation modules 11 and the power conditioner 12 in series, and when the emergency shut-off button 13 is pressed, the supply of power from the solar power generation modules 11 through the power line 14 is shut off. The second circuit breakers 30 are provided to each of a plurality of the solar power generation modules 11, are supplied with power from the first circuit breaker 20, and shut off the supply of power from the solar power generation modules 11 through the power line 14 when the supply of power is halted. The power supply line 16 connects the first circuit breaker 20 and the second circuit breakers 30, and supplies power from the first circuit breaker 20 to the second circuit breakers 30. When the first circuit breaker 20 detects that the emergency shut-off button 13 has been pressed, the supply of power from the first circuit breaker 20 to the second circuit breakers 30 is halted, and the supply of power from the solar power generation modules 11 through the power line 14 is shut off at the second circuit breakers 30.

Consequently, when the emergency shut-off button 13 is pressed in an emergency such as a fire, or during repair or maintenance, for example, first, the first circuit breaker 20 shuts off the supply of power from the solar power generation modules 11 to the power conditioner 12, and also halts the supply of power to the second circuit breakers 30, which also allows the supply of power from the solar power generation modules 11 to the power conditioner 12 to be shut off on the second circuit breaker 30 side where the supply of power has been halted.

As a result, when the emergency shut-off button 13 is pressed, it is possible to prevent the high-voltage power supplied from the solar power generation modules 11 from being applied, which ensures the safety of workers and the like. Also, by using a combination of the second circuit breakers 30, which are provided to each of a plurality of the solar power generation modules 11, and the first circuit breaker 20, which controls shut-off in the second circuit breakers 30, the installation cost can be reduced compared to a conventional configuration in which one circuit breaker is provided for each individual solar power generation module 11.

Furthermore, because the first circuit breaker 20, which is provided just upstream from the power conditioner 12, is put in a shut-off state before the second circuit breakers 30, which are provided to each of a plurality of the solar power generation modules 11, the voltage applied to the contact portion when the second circuit breakers 30 are switched from their closed state to their open state can be kept lower than that of the first circuit breaker 20.

As a result, since the withstand voltage of the second circuit breakers 30 provided to each of a plurality of the solar power generation modules 11 can be set low, the cost can be greatly reduced as compared with a configuration in which one circuit breaker with a high withstand voltage is provided for each individual solar power generation module.

Also, since shut-off control of the second circuit breakers 30 can be performed by halting the supply of power from the first circuit breaker 20 to the second circuit breakers 30, the second circuit breakers 30 can be reliably changed to a shut-off state without relying on the reliability of communication between the first circuit breaker 20 and the second circuit breakers 30.

OTHER EMBODIMENTS

An embodiment of the present invention was described above, but the present invention is not limited to or by the above embodiment, and various modifications are possible without departing from the gist of the invention.

(A)

In the above embodiment, an example was given in which the first circuit breaker 20 functioning as a master unit was disposed at a position adjacent to the upstream side of the power conditioner 12 in the supply direction of the power supplied from the solar power generation modules 11, but the present invention is not limited to this.

For instance, the system may be configured such that the first circuit breaker functioning as the master unit is installed in a state of being integrated with the power conditioner.

Alternatively, the first circuit breaker may be disposed anywhere within the system so long as it is on the upstream side of the inverter included in the power conditioner of the solar power generation network shut-off system.

(B)

In the above embodiment, an example was given in which the emergency shut-off button 13, which was pressed during repair or maintenance or in the event of an emergency such as a fire, and which shut off the supply of power from the solar power generation modules 11, was connected to the power conditioner 12, but the present invention is not limited to this.

For instance, the emergency shut-off button may be provided anywhere within the system.

(C)

In the above embodiment, an example was given in which the system was configured such that one second circuit breaker 30 was installed for four solar power generation modules 11. However, the present invention is not limited to this.

For instance, the system configuration may be such that one second circuit breaker is provided for two or three solar power generation modules, or the system configuration may be such that one second circuit breaker is provided for five or more solar power generation modules.

(D)

In the above embodiment, an example was given in which, when the emergency shut-off determination unit 21b determined that the emergency shut-off button 13 had been pressed, the display signal control unit 21f transmitted to the power conditioner 12 a display signal controlling the display unit 46 so as to display that emergency shut-off was in progress. However, the present invention is not limited to this.

For instance, the device for displaying a message indicating that emergency shut-off is in progress is not limited to the power conditioner, and may instead be a display unit provided to the first circuit breaker or the second circuit breakers, etc.

(E)

In the above embodiment, an example was given in which the holding circuit unit 21d of the first circuit breaker 20 set a hold period from when the emergency shut-off determination unit 21b determined that the emergency shut-off button 13 had been pressed until the supplied power control unit 21e halted the supply of power to the second circuit breakers 30. However, the present invention is not limited to this.

For instance, shut-off at the second circuit breakers may be performed by halting the supply of power to the second circuit breakers immediately after the shut-off of the first circuit breaker is completed, without waiting for the hold period.

However, in order to reliably shut off the second circuit breakers after the shut-off of the first circuit breaker, it is preferable to set a hold period as in the above embodiment.

INDUSTRIAL APPLICABILITY

The solar power generation network shut-off unit of the present invention has the effect of reducing the installation cost when installing circuit breakers that operate in an emergency or the like, and is therefore widely applicable to solar power generation systems that include circuit breakers.

REFERENCE SIGNS LIST 1 solar power generation network shut-off unit
10 solar power generation network shut-off system
11 solar power generation module
12 power conditioner
12a relay
12b inverter
12c relay
13 emergency shut-off button
14 power line
14a connector
15 commercial power system
16 power supply line
17 signal line
20 first circuit breaker
20a AC power supply
21 control unit
21a emergency shut-off button input unit
21b emergency shut-off determination unit (first emergency shut-off determination unit)
21c shut-off control unit (first shut-off control unit)
21d holding circuit unit
21e supplied power control unit
21f display signal control unit
22 power supply unit
23 shut-off unit (first shut-off unit)
24 power output unit
25 display signal output unit
30 second circuit breaker
31 power input unit
32 shut-off unit (second shut-off unit)
32a coil
41 DC power input unit
42 DC/AC conversion unit
43 AC power output unit
44 signal receiving unit
45 display control unit
46 display unit
46a display screen

The invention claimed is:

1. A solar power generation network shut-off unit that is disposed between a plurality of solar power generation modules and a power conditioner, and that shuts off the supply of power from the solar power generation modules to the power conditioner when an emergency shut-off button is pressed, the unit comprising:
   a first circuit breaker that is provided on a power line connecting the solar power generation modules and the power conditioner in series, the first circuit breaker configured to shut off a supply of power from the solar power generation modules through the power line when the emergency shut-off button is pressed;
   second circuit breakers that are provided to each of a plurality of the solar power generation modules, to which power is supplied from the first circuit breaker, the second circuit breakers configured to shut off the supply of power from the solar power generation modules through the power line when a supply of power through a power supply line is halted; and
   the power supply line configured to connect between the first circuit breaker and the second circuit breakers, wherein the second circuit breakers are in closed state while receiving power from the first circuit breaker through the power supply line, and supply power from the first circuit breaker to the second circuit breakers, when the first circuit breaker detects the pressing of the emergency shut-off button, the supply of power from the first circuit breaker to the second circuit breakers through the power supply line is halted, and the supply of power from the solar power generation modules to the power conditioner through the power line is shut off at the second circuit breakers.

2. The solar power generation network shut-off unit according to claim 1, further comprising a controller configured to perform, in connection with the first circuit breaker, operations comprising:
   operation as a first emergency shut-off determination unit configured to detect that the emergency shut-off button has been pressed;
   operation as a first shut-off unit configured to shut off the supply of power from the solar power generation modules through the power line;
   operation as a first shut-off control unit configured to control the first shut-off unit so as to shut off the supply of power when the first emergency shut-off determination unit determines that the emergency shut-off button has been pressed;
   operation as a power output unit configured to supply power to the second circuit breakers; and
   operation as a supplied power control unit configured to control the power output unit so as to halt the supply of power to the second circuit breakers when the first emergency shut-off determination unit determines that the emergency shut-off button has been pressed.

3. The solar power generation network shut-off unit according to claim 2,
   wherein the controller is configured to perform, in connection with the first circuit breaker, operations further comprising operation as a holding unit configured to set a hold period from when the first emergency shut-off determination unit determines that the emergency shut-off button has been pressed until the supplied power control unit halts the supply of power to the second circuit breakers.

4. The solar power generation network shut-off unit according to claim 2,
   wherein the controller is configured to perform, in connection with the first circuit breaker, operations further comprising operation as a display signal output unit configured to transmit to the power conditioner a display signal for controlling a display unit provided to the power conditioner so as to display that emergency shut-off is in progress when the first emergency shut-off determination unit determines that the emergency shut-off button has been pressed.

5. The solar power generation network shut-off unit according to claim 1, further comprising a controller configured to perform, in connection with the second circuit breakers operations comprising:
   operation as a power input unit to which power is supplied from the first circuit breaker, and
   operation as a second shut-off unit configured to shut off the supply of power from the solar power generation modules through the power line when the supply of power to the power input unit is halted.

6. A solar power generation network shut-off system, comprising:
   the solar power generation network shut-off unit according to claim 1;
   the plurality of solar power generation modules;

the power conditioner;
the power line; and
the emergency shut-off button.

\* \* \* \* \*